(12) United States Patent
Bauerle et al.

(10) Patent No.: US 6,513,492 B1
(45) Date of Patent: Feb. 4, 2003

(54) LIMITED ACCELERATION MODE FOR ELECTRONIC THROTTLE CONTROL

(75) Inventors: Paul Alan Bauerle, Fenton, MI (US); Mark Henry Costin, Bloomfield Township, MI (US); Robert J. Schaller, Brighton, MI (US); James T. Purcell, Goleta, CA (US); Robert Charles Simon, Jr., Novi, MI (US); Mario Vincent Maiorana, Jr., Davisburg, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/919,336

(22) Filed: Jul. 31, 2001

(51) Int. Cl.⁷ .................................................. F02D 9/02
(52) U.S. Cl. ........................................ 123/396; 123/399
(58) Field of Search ................................. 123/396, 397, 123/399

(56) References Cited

U.S. PATENT DOCUMENTS

| | | | | |
|---|---|---|---|---|
| 4,976,239 A | * | 12/1990 | Hosaka | 123/399 |
| 5,999,875 A | * | 12/1999 | Bruedigam et al. | 123/198 D |
| 6,073,610 A | * | 6/2000 | Matsumoto et al. | 123/396 |
| 6,178,947 B1 | * | 1/2001 | Machida et al. | 123/396 |
| 6,343,586 B1 | * | 2/2002 | Muto et al. | 123/399 |

* cited by examiner

Primary Examiner—Erick Solis
(74) Attorney, Agent, or Firm—Christopher DeVries

(57) ABSTRACT

A method of controlling a motor vehicle engine having an electronic throttle including positioning the electronic throttle in response to a requested throttle area, determining a fault in the vehicle engine, limiting the throttle area after a fault has been determined to control vehicle speed, limiting acceleration of the vehicle after the fault has been determined, and determining if the engine may be operated at full throttle after the fault has been determined to allow the vehicle to operate in a high power demand application.

12 Claims, 5 Drawing Sheets

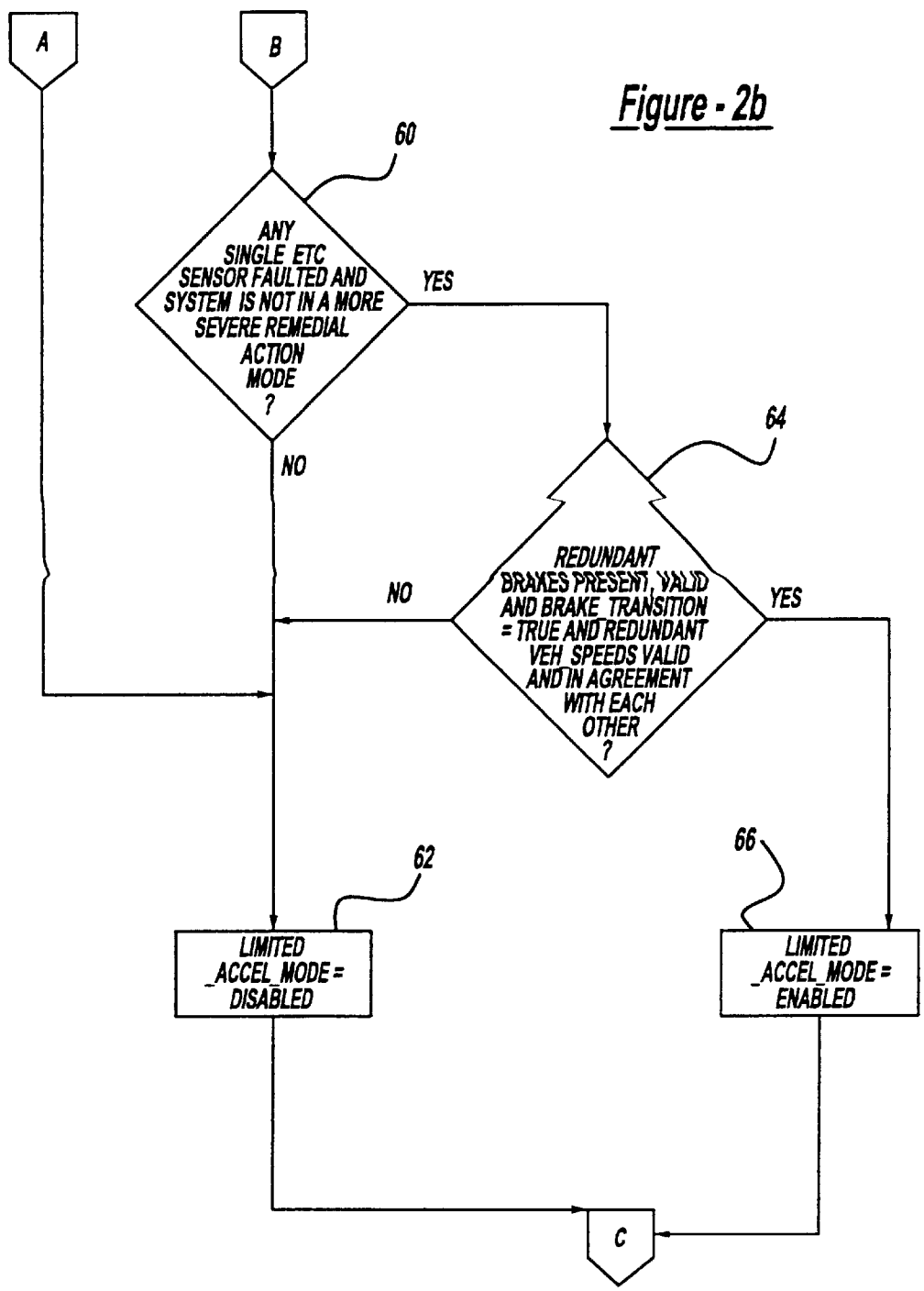

LIMITED ACCELERATION MODE FOR ELECTRONIC THROTTLE CONTROL

TECHNICAL FIELD

This invention relates to a method of operation for a vehicle electronic throttle control (ETC) system, and more particularly to a method of using the throttle control system to govern vehicle acceleration, speed and power during a fault.

BACKGROUND OF THE INVENTION

In a vehicle ETC system, the engine throttle plate is mechanically de-coupled from the driver-operated accelerator pedal, and instead is positioned by an electric motor under the control of an electronic or powertrain control module (PCM). The motor is activated to position the throttle plate in response to accelerator pedal movement, but may also be controlled to achieve other functions such as idle speed control, engine speed governing, cruise control, torque reduction for traction control, and vehicle acceleration governing. In general, the PCM or another controller determines a desired effective throttle area to achieve a given function, and the PCM activates the motor to move the throttle plate to a position corresponding to the desired throttle area. In addition to electronic throttle control, the PCM can regulate vehicle acceleration and engine power with the fuel injectors or spark retard.

SUMMARY OF THE INVENTION

The present invention concerns an improved method of vehicle acceleration governing an ETC system. The acceleration governing function is typically requested under certain fault conditions, such as a sensor fault, and operates under such fault conditions to limit the vehicle acceleration to a threshold value, which may be determined based on a change in vehicle speed. Sensor faults may include, but are not limited to, an airflow sensor fault, and pedal or throttle sensors generating an out-of-range value. The throttle limits the vehicle acceleration and engine power by limiting the throttle area to a predetermined calibrated value during such a fault condition. On flat driving conditions at sea level, this limited calibrated throttle area will correspond to a vehicle speed, but during operation on terrain inclinations, at altitude, or during high power or torque demand operating conditions such as towing, this limited throttle area may not be great enough to ensure a minimum speed. Thus, the limited speed produced by the fixed throttle limit is heavily dependent on operating environment and vehicle loading. This invention overcomes these limitations while maintaining a safe vehicle response during a sensor failure. When sufficient redundancy exists (such as having two brake indications and two vehicle speed readings), it would be desirable to allow full throttle operation if acceleration can be limited. The present invention will monitor vehicle speed and acceleration and allow the throttle plate to move to a position beyond its limited calibrated throttle area during a fault condition to allow a desired torque output during a high power torque demand operating condition.

DESCRIPTION OF THE PREFERRED EMBODIMENT

Figure 1:
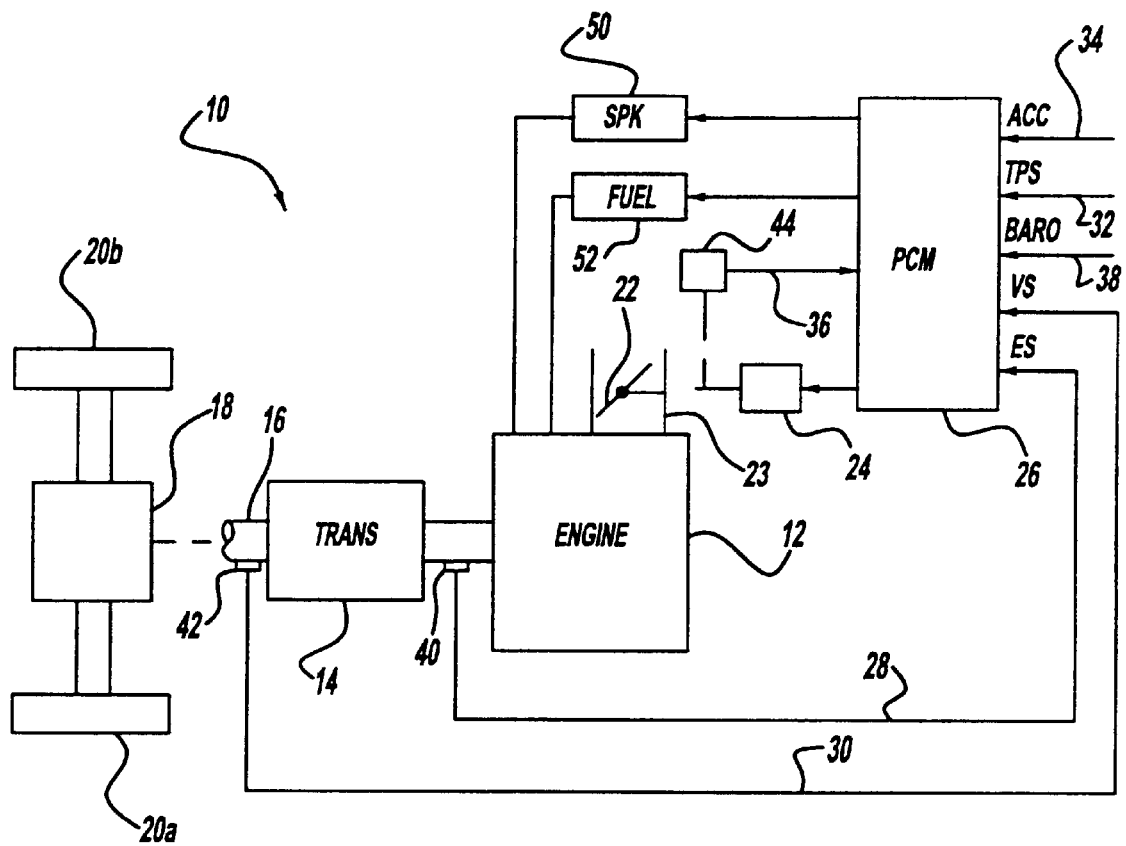
FIG. 1 is a schematic diagram of a vehicle having an electronic throttle control system according to this invention, including an electronic control unit.

Referring to the drawings, and particularly to FIG. 1, the reference numeral 10 generally designates a vehicle drive train including an engine 12 coupled to a multiple-speed ratio transmission 14, which in turn is coupled via drive shaft 16 and differential 18 to a pair of driven wheels 20a–20b. The position of a throttle 22 disposed within an intake manifold 23 of engine 12 is controlled to produce power for driving the wheels 20a–20b. The throttle 22 is mechanically de-coupled from a driver-manipulated accelerator pedal (not shown) and instead is positioned by an electric motor 24 under the control of a engine or powertrain control module (PCM) 26, which also controls the operation of engine 12 and transmission 14. The PCM 26 is microprocessor based and operates in response to a number of inputs, including, but not limited to, an engine speed signal ES on line 28, a vehicle speed signal VS on line 30, an accelerator pedal position signal TPS on line 32, an accessory loading signal ACC on line 34, a throttle position feedback signal on line 36, and a barometric or ambient air pressure signal BARO on line 38. These inputs are provided by various conventional sensors such as the illustrated shaft speed sensors 40, 42 and throttle position sensor 44. In general, the PCM 26 activates motor 24 to position the throttle 22 in accordance with a desired throttle area TAdes determined in response to accelerator pedal position and various control functions such as idle speed control, engine governor control, cruise control, and traction control. Additionally, the PCM 26 controls conventional spark and fuel control devices 50, 52 coupled to engine 12.

According to this invention, the PCM 26 controls the motor 24 during periods of engine power limiting so as to limit the vehicle acceleration to a calibrated value based on vehicle speed. The control is described in U.S. Pat. No. 6,167,343 to Bauerle, which is incorporated in its entirety by reference herein.

During certain operating conditions such as a single point sensor failure, the speed of the vehicle will be limited by the position of the throttle 22. The position of the throttle 22 is related to both the speed of the vehicle and the torque output of the engine 12. As described previously, during certain driving conditions that involve high torque demand, the air flow through the throttle 22 at a limited position will not be great enough to produce a desired torque for applications such as towing. The limited torque produced by the fixed throttle limit is heavily dependent on operating environment and vehicle loading. This invention overcomes these limitations while maintaining a safe vehicle response during the sensor failure.

Figure 2A:
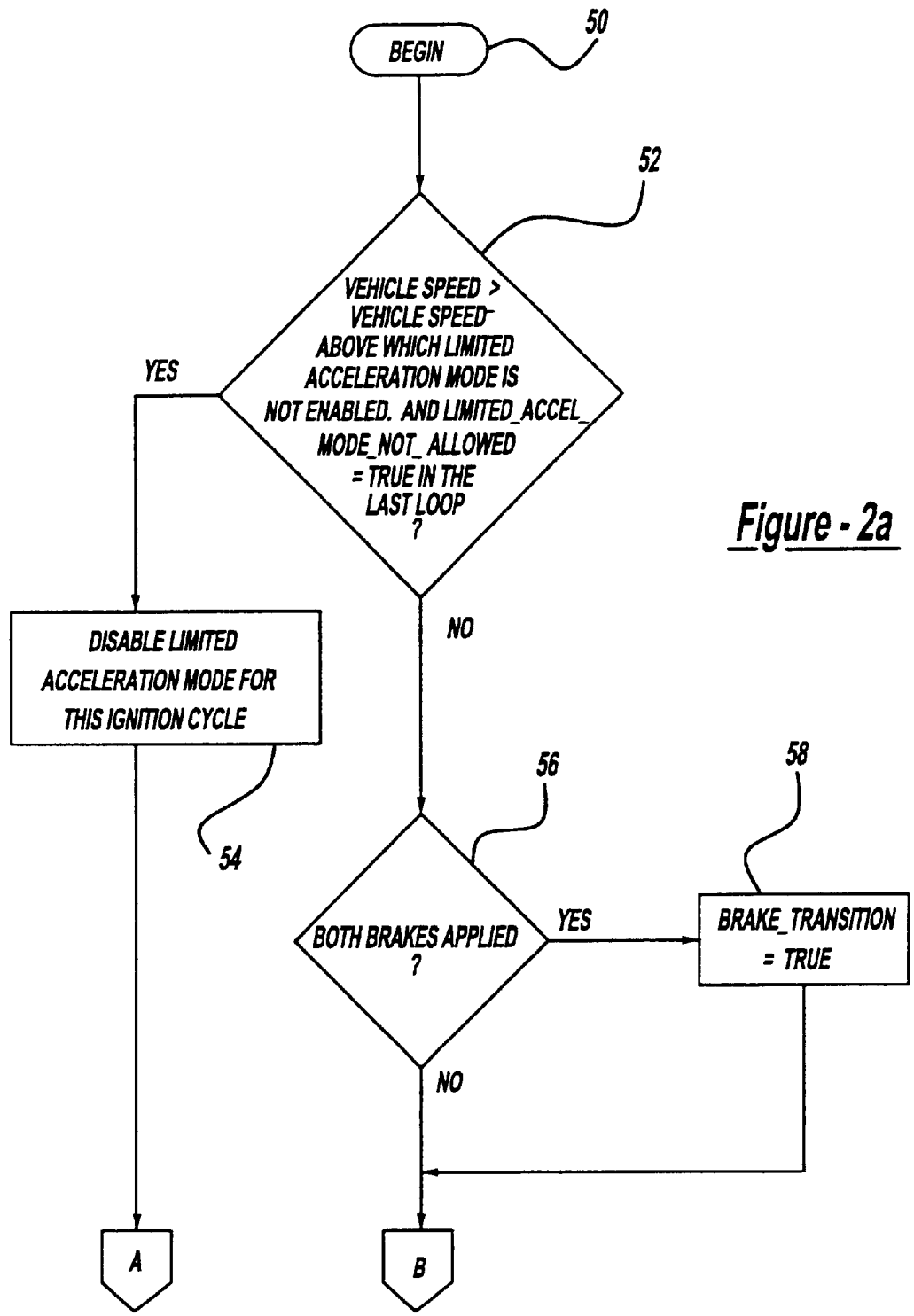
FIG. 2 is a flow diagram representative of a computer program executed by the electronic control unit of FIG. 1 in carrying out the acceleration governing control of this invention.
Figure 2C:
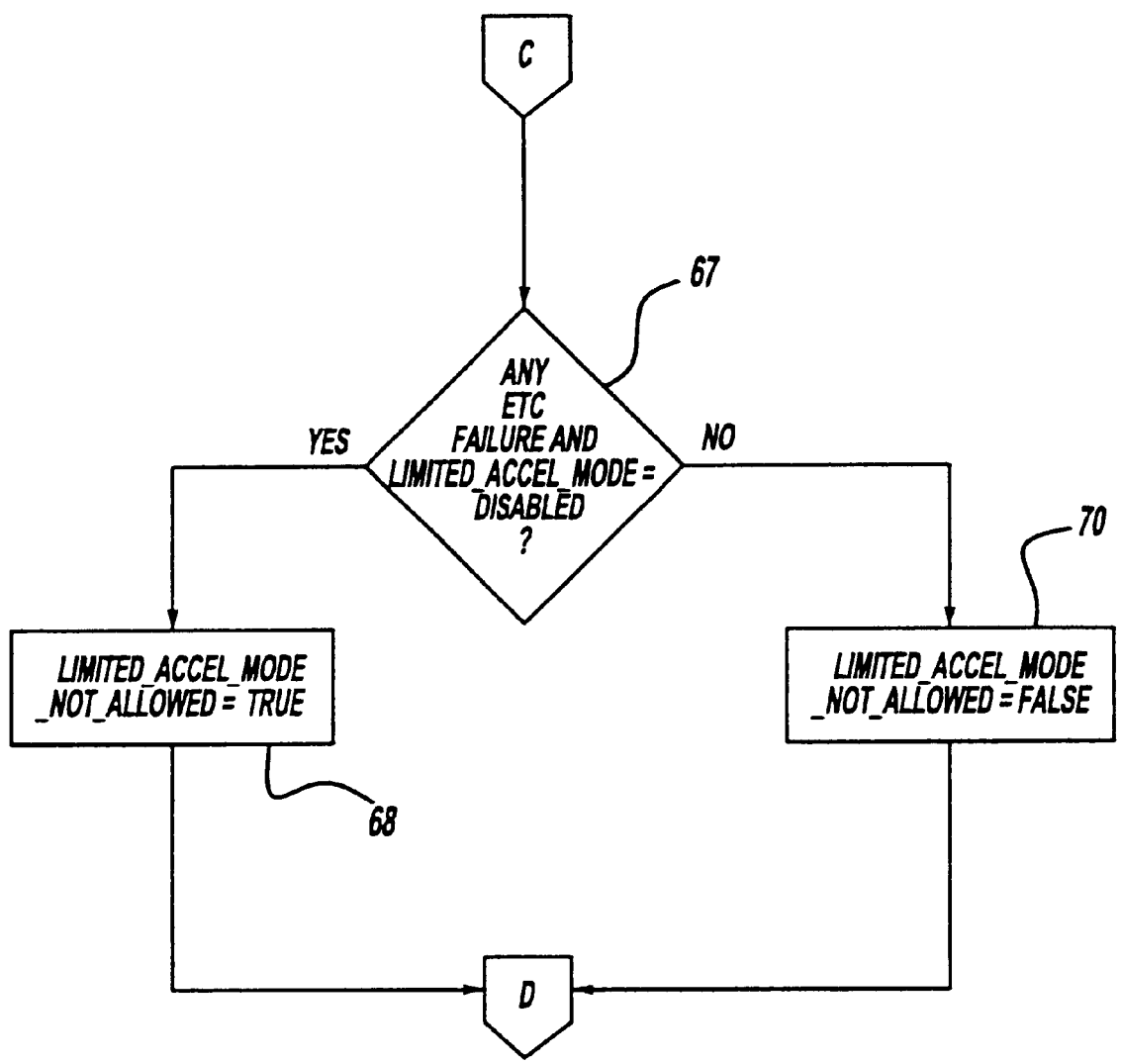
Figure 2D:
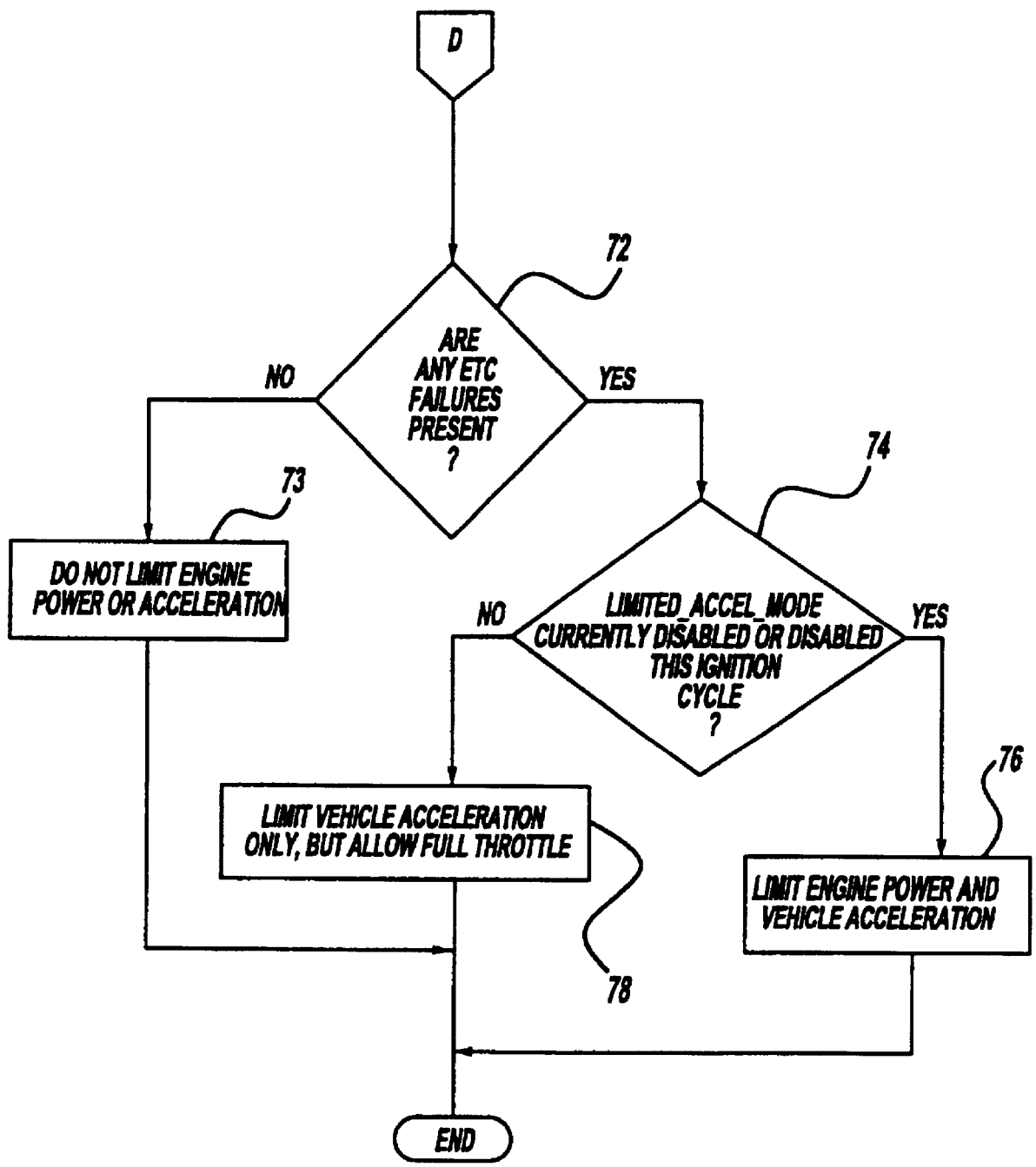

Referring to FIG. 2, the method of the present invention is illustrated in flow chart form. The method begins at block 50 as a periodic loop to allow continuous evaluation of the conditions allowing limited acceleration mode. This method repeats every 50 ms to monitor current conditions often enough to allow this mode to be disabled if a more serious system fault develops. Such serious faults may include the loss of all throttle or pedal sensors, loss of ETC motor control (actuator fault), or internal PCM processor faults.

At block 52, if the vehicle speed is greater than or equal to the vehicle speed above which limited acceleration operating mode is not allowed to be enabled, if it has been previously disabled, and there has been no brake application (typically set to around 5 MPH, below which limited acceleration throttle area limit defaults to a fixed throttle area due to the inaccuracy of acceleration at this low speed), and limited_accel_mode_not_allowed=TRUE, as indicated by a flag from the last loop at block 68, then disable the limited acceleration mode for the ignition cycle at block 54 and continue to block 62. The flag, limited_accel_mode_not_allowed, indicates whether the system may enter the limited acceleration operating mode and if TRUE will not allow entry into the limited acceleration operating mode. The determination at block 52 is required in case the vehicle has a single sensor fault at startup before the driver applies the brake pedal at least once. Normally, the ETC system security requires the system to never transition from a more restrictive mode (limited power) to a less restrictive mode (limited acceleration) during the same ignition cycle to maintain system stability and security. This transition may be made if the vehicle speed is low since there will always be a limited throttle area clamp on the throttle. If this check was not present, in a situation where the vehicle starts up with a single sensor fault that causes the PCM to enter a limited power operation (because the brakes have not yet been applied), the system would stay in limited power and never transition into limited acceleration mode.

If the vehicle speed is not greater then the speed allowed under the limited acceleration operating mode or the limited acceleration mode is allowed, then the method will continue to block 56 to determine if both the primary brake and a secondary brake are applied. The brakes provide an important security function for reducing the throttle limit to idle whenever the brakes are applied when operating during an ETC sensor failure. If both brakes are applied, the brake_transition flag is set to true at block 58 and the method continues to block 60. If both brakes are not applied, then the method will also continue to block 60 to determine if any single ETC sensor is faulted and the system is not in a more severe remedial action mode. If there is not a single ETC sensor fault or the system is in a more severe remedial action, then the method will continue to block 62 and disable the limited acceleration mode. If there is a single ETC sensor fault and the vehicle is not in a severe remedial action mode, then the method will continue to block 64. Sensor failures may include at least the failure of one pedal or throttle sensor and severe remedial action will occur when there is a loss of all throttle or pedal sensors, a loss of ETC motor control (actuator fault), or internal PCM processor faults. The present invention includes redundant sensors for brake pedal and accelerator pedal position, throttle position feedback and vehicle speed such as a transmission output shaft speed sensor or individual wheel speed sensors.

At block 64, if the redundant brakes sensors exist and are operating correctly, the brake_transition flag is true, and redundant vehicle speeds are valid and in agreement with each other, the method will enter limited acceleration mode at block 66 and continue to block 67. The conditions tested in block 64 provide sufficient redundancy to allow the throttle to reach full throttle even during a single sensor fault. If these condition are not true, at block 62, the method will disable limited acceleration mode and continue to block 67.

At block 67, the method will determine if any ETC failures exist and limited acceleration is disabled. If these conditions are met, the method will continue to block 68 and not allow entry into a limited acceleration mode. The variable/flag, limited_accel_mode_not_allowed, set at block 68 is used for the next iteration through this method in block 52, by indicating the ETC failure exists but limited acceleration mode is currently not allowed. Normally, the ETC system security requires the system to never transition from a more restrictive mode (limited power) to a less restrictive mode (limited acceleration) during the same ignition cycle to maintain system stability and security. This transition may be made once if the vehicle speed is low since there will always be a limited throttle area clamp on the throttle, and the driver of the vehicle will not notice any change in operation. If the conditions of block 67 are not met, limited_accel_mode_not_allowed at block 70 will be set to false and the method will continue to block 72.

At block 72, the method will determine if any ETC failures are present and continue to block 74. If no ETC failures are present, the method will continue to block 73 and not impose a limit to the engine 12 power or torque and acceleration. The driver has normal control through the accelerator pedal or cruise control system, since all system diagnostics are reporting normal operation.

With ETC failures present, at block 74 the method determines if the limited acceleration mode is currently disabled or disabled in the present ignition cycle. To address driveability concerns, the driver will not have a limited throttle area operation on one drive cycle and a limited acceleration (with full throttle) on the next drive cycle. A drive cycle here is defined as a tip-in of the accelerator pedal and the resulting vehicle speed increase, followed by a brake application and a return to a stop. If the limited acceleration mode is disabled, then engine power and vehicle acceleration at block 76 will be limited. If the limited acceleration mode is enabled, the method at block 78 will limit vehicle acceleration but allow full throttle for a high torque or load condition. With the above-described control, vehicle acceleration governing can be carried out with a high degree of stability and accuracy and still allow open throttle operating conditions.

While this invention has been described in reference to the illustrated embodiment, it is expected that various modifications in addition to those suggested above will occur to those skilled in the art. In this regard, it will be understood that the scope of this invention is not limited to the illustrated embodiment, and that controls incorporating such modifications may fall within the scope of this invention, which is defined by the appended claims.

What is claimed is:

1. A method of controlling a motor vehicle engine having an electronic throttle comprising:

positioning the electronic throttle in response to a requested throttle area;

determining a fault in the vehicle;

limiting the throttle area after a fault has been determined to control vehicle speed;

limiting acceleration of the vehicle after the fault has been determined; and determining if the engine may be operated at full throttle after the fault has been determined to allow the vehicle to operate in a high power demand application.

2. The method of claim 1 wherein the fault comprises a throttle sensor fault.

3. The method of claim 1 wherein the fault comprises an accelerator pedal sensor fault.

4. The method of claim 1 further comprising the step of determining if a limited acceleration mode has been enabled each ignition cycle.

5. The method of claim 1 further comprising the step of determining if there is an electronic throttle fault.

6. A motor vehicle acceleration governing method for a system in which an engine throttle in an engine is electronically positioned in response to a requested throttle area, comprising the steps of:

determining a vehicle acceleration limit based on a measure of vehicle speed;

determining an open-loop governed throttle area for maintaining the determined acceleration limit on flat terrain with nominal vehicle loading;

computing an acceleration of the vehicle based on successively measured values of vehicle speed;

entering a limited acceleration mode wherein the throttle area is initially limited to said governed throttle area upon the determination of a fault to limit acceleration; and allowing an open throttle position after entering said limited acceleration mode to allow high load operation while still limiting acceleration.

7. The acceleration governing method of claim 6, wherein the step of computing the acceleration of the vehicle includes computing a least squares approximation of acceleration based on said successively measured values of vehicle speed.

8. The acceleration governing method of claim 6, wherein the step of determining an open-loop throttle area includes the step of retrieving an open-loop throttle area from a table of throttle areas stored as a function of vehicle speed.

9. A method of controlling a motor vehicle engine having an electronic throttle comprising:

entering a limited acceleration mode upon the determination of a sensor fault;

initially limiting the throttle area upon entering the limited acceleration mode;

determining if the vehicle engine is operating under a high load condition in the limited acceleration mode; and allowing an open throttle condition during a high load condition while still limiting acceleration.

10. The method of claim 9 wherein the fault comprises a throttle sensor fault.

11. The method of claim 9 wherein the fault comprises an accelerator pedal sensor fault.

12. The method of claim 9 further comprising the step of determining if redundant sensors exist to allow entry into the limited acceleration mode.

* * * * *